United States Patent
Kishikawa et al.

(10) Patent No.: US 12,536,289 B2
(45) Date of Patent: Jan. 27, 2026

(54) INTEGRITY VERIFICATION DEVICE AND INTEGRITY VERIFICATION METHOD

(71) Applicant: Panasonic Intellectual Property Corporation of America, Torrance, CA (US)

(72) Inventors: Takeshi Kishikawa, Osaka (JP); Ryo Hirano, Kanagawa (JP); Yoshihiro Ujiie, Tokyo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 190 days.

(21) Appl. No.: 18/515,925

(22) Filed: Nov. 21, 2023

(65) Prior Publication Data

US 2024/0086541 A1 Mar. 14, 2024

Related U.S. Application Data

(63) Continuation of application No. PCT/JP2022/021723, filed on May 27, 2022.

(30) Foreign Application Priority Data

May 31, 2021 (WO) .................. PCT/JP2021/020679

(51) Int. Cl.
*H04L 29/06* (2006.01)
*G06F 21/57* (2013.01)
*G06F 21/64* (2013.01)

(52) U.S. Cl.
CPC .............. *G06F 21/57* (2013.01); *G06F 21/64* (2013.01); *G06F 2221/033* (2013.01)

(58) Field of Classification Search
CPC ..... G06F 21/57; G06F 21/64; H04L 63/1416; H04L 63/145; H04L 63/20; H04L 63/0263

See application file for complete search history.

(56) References Cited

U.S. PATENT DOCUMENTS

| | | | |
|---|---|---|---|
| 2008/0155509 A1* | 6/2008 | Ohta | G06F 21/572 717/127 |
| 2010/0169967 A1 | 7/2010 | Khosravi et al. | |
| 2020/0216097 A1* | 7/2020 | Galula | G06F 21/51 |

FOREIGN PATENT DOCUMENTS

| | | |
|---|---|---|
| JP | 4288292 | 4/2009 |
| JP | 5198422 | 2/2013 |
| KR | 101-600-460 B1 * | 3/2016 |

OTHER PUBLICATIONS

International Search Report issued in International Patent Application No. PCT/JP2021/020679, dated Aug. 10, 2021, along with an English translation thereof.

(Continued)

*Primary Examiner* — Longbit Chai
(74) *Attorney, Agent, or Firm* — Greenblum & Bernstein, P.L.C.

(57) ABSTRACT

An integrity verification device, in which software is executed by one of one or more electronic control units connected to an in-vehicle network system, includes: a verification schedule determiner that determines a verification timing at which to verify the integrity of the software; an integrity verifier that, for the software, determines, at the verification timing determined for the software, whether first integrity information, that is information for verifying the integrity of the software and that corresponds to at least part of the software corresponding to a verification scope, matches second integrity information, that is information calculated from at least part of the software at the verification timing, and determines that the integrity of the software is ensured when the first integrity information and the second integrity information match; and a verification priority determiner that determines a verification priority that affects determining of the verification timing or the verification scope.

10 Claims, 11 Drawing Sheets

(56) References Cited

OTHER PUBLICATIONS

International Search Report issued in International Patent Application No. PCT/JP2022/021723, dated Aug. 9, 2022, along with an English translation thereof.
Extended European Search Report issued in European Patent Application No. 22815995.0, dated Jul. 30, 2024.

* cited by examiner

| Verification target | Verification result | Last verification time |
|---|---|---|
| 104a | OK | 100 |
| 104b | OK | 102 |
| 104c | OK | 103 |

| Verification target | Hash value |
|---|---|
| 104a | XXXXXXX |
| 104b | YYYYYYY |
| 104c | ZZZZZZZ |

FIG. 7

| Vehicle state | Current state |
|---|---|
| Travel state | Stopped |
| External NW connection | Yes |
| Communication anomaly | No |

FIG. 8

| Verification target | Verification priority |
|---|---|
| 104a | Low |
| 104b | Mid |
| 104c | High |

FIG. 9

| Verification target | Verification time |
|---|---|
| 100a | 160 |
| 100b | 130 |
| 100c | 110 |

INTEGRITY VERIFICATION DEVICE AND INTEGRITY VERIFICATION METHOD

CROSS REFERENCE TO RELATED APPLICATIONS

This is a continuation application of PCT International Application No. PCT/JP2022/021723 filed on May 27, 2022, designating the United States of America, which is based on and claims priority of PCT International Application No. PCT/JP2021/020679 filed on May 31, 2021. The entire disclosures of the above-identified applications, including the specifications, drawings and claims are incorporated herein by reference in their entirety.

FIELD

The present disclosure relates to an integrity verification device and an integrity verification method for verifying the integrity of software.

BACKGROUND

PTL 1 discloses a technique for verifying the integrity of software.

PTL 2 discloses a monitoring device that verifies software based on a set monitoring schedule.

CITATION LIST

Patent Literature

PTL 1: Japanese Patent No. 5198422
PTL 2: Japanese Patent No. 4288292

SUMMARY

Technical Problem

The present disclosure provides an integrity verification device and an integrity verification method that, for software that operates in an ECU installed in a control network of an automobile, may be capable of verifying high-risk software preferentially.

Solution to Problem

A verification device according to one aspect of the present disclosure is an integrity verification device that verifies an integrity of one or more pieces of software in an in-vehicle network system. Each of the one or more pieces of software is executed by one of one or more electronic control units connected to the in-vehicle network system. The integrity verification device includes: a verification schedule determiner that determines a verification timing at which to verify the integrity of each of the one or more pieces of software; an integrity verifier that, for each piece of software among the one or more pieces of software, determines, at the verification timing determined for the piece of software, whether first integrity information matches second integrity information, and determines that the integrity of the piece of software is ensured when the first integrity information and the second integrity information match, the first integrity information being information for verifying the integrity of the piece of software and that corresponds to at least a part of the piece of software corresponding to a verification scope, and the second integrity information being information calculated from at least a part of the piece of software at the verification timing; and a verification priority determiner that determines a verification priority that affects determining of the verification timing or the verification scope.

Note that these comprehensive or specific aspects may be realized by a system, a method, an integrated circuit, a computer program, or a computer-readable non-transitory recording medium such as a CD-ROM, or may be implemented by any desired combination of systems, devices, methods, integrated circuits, computer programs, and non-transitory recording media.

Advantageous Effects

According to the integrity verification device and the like according to an aspect of the present disclosure, high-risk software may be able to be verified preferentially in an in-vehicle network system.

BRIEF DESCRIPTION OF DRAWINGS

These and other advantages and features will become apparent from the following description thereof taken in conjunction with the accompanying Drawings, by way of non-limiting examples of embodiment disclosed herein.

FIG. 7 is a diagram illustrating an example of vehicle states according to an embodiment.

FIG. 8 is a diagram illustrating an example of verification priorities according to the embodiment.

FIG. 9 is a diagram illustrating an example of a verification schedule according to the embodiment.

DESCRIPTION OF EMBODIMENT

Figure 1:
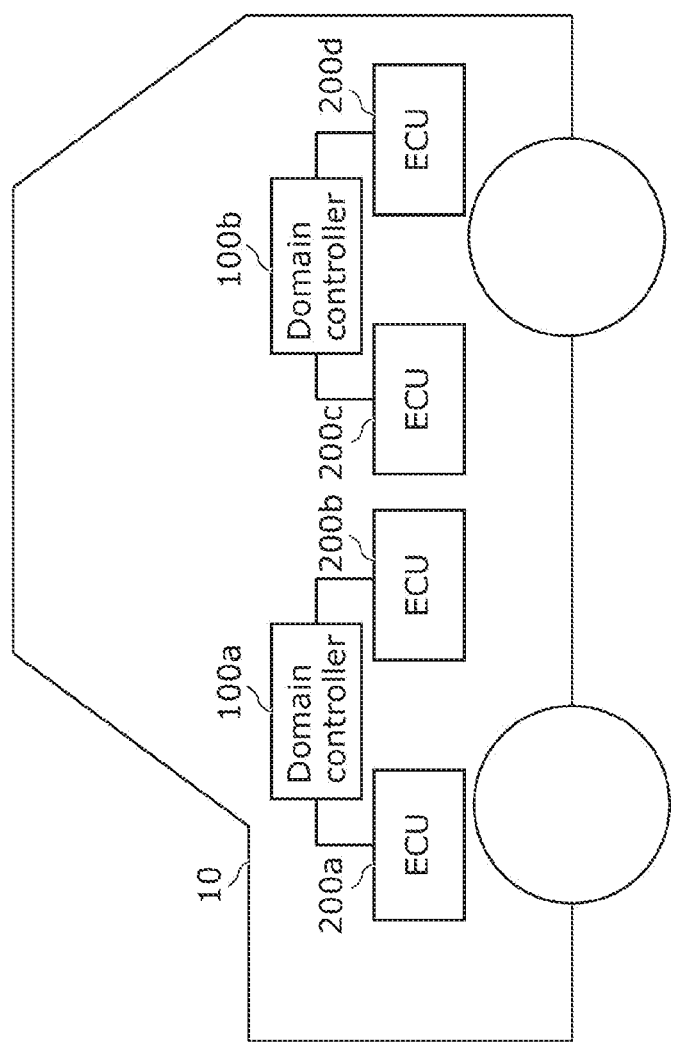
FIG. 1 is a diagram illustrating the configuration of an in-vehicle network system according to an embodiment.

In recent years, systems installed in automobiles have come to include many devices called Electronic Control Units (ECUs). A network which connects these ECUs is called an "in-vehicle network". As automobiles have become more sophisticated, the amount of information handled by ECUs has increased, leading to an increase in the number of ECUs installed in automobiles and the lengths of harnesses connecting the ECUs. This has resulted in a problem in that the weights of automobiles have increased.

One approach in such a situation is to reduce the number of ECUs by integrating the functions thereof. An integrated ECU is called a "domain controller", which realizes the functions (software) of multiple virtualized ECUs using a single piece of hardware equipped with a high-performance central processing unit (CPU).

ECU functions are virtualized using a technology called a "hypervisor", and a virtual machine (VM) that realizes each function is run on the hypervisor. Virtual machines have different operating systems, security levels, function safety levels, and the like depending on the functions to be realized. There are therefore security risks, such as the most vulnerable virtual machine being compromised affecting other virtual machines running on the domain controller.

For such situations, techniques that verify the integrity of running software have been publicized, such as PTL 1, for example.

Incidentally, verifying the integrity of each of virtual machines in automobile ECUs is conceivable.

However, verifying the integrity of all virtual machines at once in an integrated ECU environment leads to an increase in verification time, which is undesirable in systems that require real-time performance. Meanwhile, PTL 2 discloses a monitoring device that verifies software based on a set monitoring schedule.

However, in a device such as a domain controller, where multiple virtual machines are running, the high-risk virtual machine can change depending on the status of the automobile, and thus pre-scheduled verification cannot verify the integrity of the high-risk virtual machine at the appropriate timing. In other words, the inventors found that there is an issue with the past techniques in that it is difficult to preferentially verify the integrity of at least some high-risk software among one or more pieces of software in an in-vehicle network system.

An integrity verification device according to one aspect of the present disclosure is an integrity verification device that verifies an integrity of one or more pieces of software in an in-vehicle network system. Each of the one or more pieces of software is executed by one of one or more electronic control units connected to the in-vehicle network system. The integrity verification device includes: a verification schedule determiner that determines a verification timing at which to verify the integrity of each of the one or more pieces of software; an integrity verifier that, for each piece of software among the one or more pieces of software, determines, at the verification timing determined for the piece of software, whether first integrity information matches second integrity information, and determines that the integrity of the piece of software is ensured when the first integrity information and the second integrity information match, the first integrity information being information for verifying the integrity of the piece of software and that corresponds to at least a part of the piece of software corresponding to a verification scope, and the second integrity information being information calculated from at least a part of the piece of software at the verification timing; and a verification priority determiner that determines a verification priority that affects determining of the verification timing or the verification scope.

Through this, the integrity of at least part of the software to be verified, which is determined in an adaptive manner, can be verified based on the verification timing or the verification scope determined in accordance with the verification priority. In other words, it is possible that the integrity of at least a high-risk part of software can be verified preferentially. This makes it possible to suppress situations in which the effects of verifying the integrity of the one or more pieces of software are reduced, even if the verification frequency or the verification scope for verifying the integrity of low-risk software is reduced. Accordingly, the processing load involved in verifying the integrity of the software can be reduced in a system which requires real-time performance.

Additionally, the verification schedule determiner may determine the verification timing of one piece of software among the one or more pieces of software such that a verification frequency of the one piece of software increases as the verification priority of the one piece of software increases.

This makes it possible to verify the integrity of software at a higher frequency as the priority increases, which has an effect of improving security.

Additionally, the integrity verifier may determine the verification scope of one piece of software among the one or more pieces of software such that the verification scope broadens as the verification priority of the one piece of software increases.

This makes it possible to verify the integrity of software over a broader verification scope as the priority increases, which has an effect of improving security.

Additionally, the verification priority determiner may change the verification priority of the one piece of software in accordance with a vehicle state of a vehicle in which the in-vehicle network system is installed.

Through this, the verification priority can be determined adaptively for software in which the function or risk changes in accordance with the vehicle state, which is effective in achieving efficient verification.

Additionally, the vehicle state may include at least one of being stopped, traveling, performing automated driving, being in a diagnostic mode, charging, updating, communicating with an external network, and not communicating with an external network.

Through this, the priority can be determined adaptively for vehicle states in which the function or risk of the software changes, which is effective in achieving efficient verification.

Additionally, in accordance with the vehicle state, the verification priority determiner may change the verification priority of a piece of software for which content of processing by the piece of software changes in accordance with the vehicle state.

This makes it possible to change the verification priority for, for example, software for which the function or risk changes in accordance with the vehicle state, which is effective in achieving efficient integrity verification.

Additionally, the one or more pieces of software may be any one of an overall piece of software run on the electronic control unit, a hypervisor serving as a virtualization platform run on the electronic control unit, an operating system, a virtual machine, an application, a process, or a file.

This makes it possible to classify the software to be verified in detail, which is effective in achieving efficient integrity verification.

Additionally, the one or more pieces of software may include a plurality of pieces of software each implementing one of a plurality of virtual machines.

Through this, the verification priorities can be changed for a plurality of pieces of software that realize a plurality of virtual machines, which is effective in achieving efficient integrity verification.

Additionally, the integrity verification device may further include an anomaly monitorer that detects an anomalous state indicating at least one of a communication anomaly pertaining to the one or more pieces of software and an anomaly in a usage amount of a memory and a processor included in each of the one or more electronic control units, and the verification priority determiner may raise the verification priority corresponding to a piece of software, among the one or more pieces of software, for which the anomalous state is detected.

This makes it possible to change the priority of the integrity verification for software according to an anomalous state in the in-vehicle network system, which is effective in increasing the security in high-risk situations.

Additionally, an integrity verification method according to one aspect of the present disclosure is an integrity verification method that verifies an integrity of one or more pieces of software in an in-vehicle network system. Each of the one or more pieces of software is executed by one of one or more electronic control units connected to the in-vehicle network system. The integrity verification method includes: determining a verification timing at which to verify the integrity of each of the one or more pieces of software; for each piece of software among the one or more pieces of software, determining, at the verification timing determined for the piece of software, whether first integrity information matches second integrity information, and determining that the integrity of the piece of software is ensured when the first integrity information and the second integrity information match, the first integrity information being information for verifying the integrity of the piece of software and that corresponds to at least a part of the piece of software corresponding to a verification scope, and the second integrity information being information calculated from at least a part of the piece of software at the verification timing; and determining a verification priority that affects determining of the verification timing or the verification scope.

Through this, the integrity of at least part of the software to be verified, which is determined in an adaptive manner, can be verified based on the verification timing or the verification scope determined in accordance with the verification priority. In other words, it is possible that the integrity of at least a high-risk part of software can be verified preferentially. This makes it possible to suppress situations in which the effects of verifying the integrity of the one or more pieces of software are reduced, even if the verification frequency or the verification scope for verifying the integrity of low-risk software is reduced. Accordingly, the processing load involved in verifying the integrity of the software can be reduced in a system which requires real-time performance.

A software integrity verification device (integrity verification device) according to an embodiment of the present disclosure will be described hereinafter with reference to the drawings. Note that the following embodiments describe preferred specific examples of the present disclosure. The numerical values, shapes, materials, constituent elements, arrangements and connection states of constituent elements, steps, orders of steps, and the like in the following embodiments are merely examples of the present disclosure, and are not intended to limit the present disclosure. The present disclosure is specified based on the content of the scope of claims. Accordingly, of the constituent elements in the following embodiments, constituent elements not denoted in the independent claims, which indicate the broadest interpretation of the present disclosure, are not absolutely necessary for solving the problem of the present disclosure, and will instead be described as constituent elements constituting more preferred forms.

Embodiment

The following will describe a software integrity verification device (integrity verification device) for a vehicle including a system (an in-vehicle network system) in which a plurality of electronic control units (ECUs) communicate over an in-vehicle network.

1.1 Configuration of In-Vehicle Network System

FIG. 1 is a diagram illustrating the configuration of an in-vehicle network system according to the present embodiment. The in-vehicle network system is installed in vehicle 10. The in-vehicle network system is an example of a control network system.

As illustrated in FIG. 1, the in-vehicle network system includes domain controller 100*a*, domain controller 100*b*, ECU 200*a*, ECU 200*b*, ECU 200*c*, and ECU 200*d*.

Each of domain controller 100*a* and domain controller 100*b* is an entity that integrates ECUs to control a functional unit called a "domain". As a specific example, a cockpit domain controller integrates a number of functions including an in-vehicle infotainment system, an external network connection, heads-up display control, surrounding view monitor control, and the like. Each of domain controller 100*a* and domain controller 100*b* has the functionality of a plurality of ECUs.

Domain controller 100*a* and domain controller 100*b* are devices that include, for example, digital circuitry including processors (microprocessors) and memory, analog circuitry, communication circuitry, and the like. The memory includes read-only memory (ROM), random access memory (RAM), and the like, which can store a control program (computer program) executed by the processor.

Each function of domain controllers 100*a* and 100*b* is realized by an independent virtual machine on a hypervisor. Domain controllers 100*a* and 100*b* have an integrity verification function that verifies the integrity of a control program executed on each virtual machine. Domain controllers 100*a* and 100*b* are examples of integrity verification devices that verify the integrity of one or more pieces of software in an in-vehicle network. The control program is an example of the software. The verification of the integrity of the software may be referred to as "integrity verification".

Domain controller 100*a* and domain controller 100*b* are connected to and communicate with ECU 200*a*, ECU 200*b*, ECU 200*c*, and ECU 200*d*, or other domain controllers not illustrated in the drawings, over the in-vehicle network. Controller Area Network (CAN) (registered trademark), FlexRay (registered trademark), and Ethernet (registered trademark) can be used as the in-vehicle network. Although not shown in FIG. 1, the in-vehicle network can include more domain controllers.

ECU 200*a*, ECU 200*b*, ECU 200*c*, and ECU 200*d* are connected to domain controller 100*a* or domain controller 100*b* over the in-vehicle network, and control vehicle 10 by exchanging control instructions with domain controller 100*a* or domain controller 100b, and communicating sensor data and the like. Although not illustrated in FIG. 1, the in-vehicle network can include more ECUs.

ECU 200a, ECU 200b, ECU 200c, and ECU 200d are connected to sensors, actuators, and the like (not shown), and obtain sensor information detected by the sensors, control the actuators, and the like.

ECU 200a, ECU 200b, ECU 200c, and ECU 200d are devices that include, for example, digital circuitry including a processor (a microprocessor) and memory, analog circuitry, communication circuitry, and the like. The memory includes ROM, RAM, and the like, which can store a control program (computer program) executed by the processor. The control program is an example of the software.

For example, ECU 200a, ECU 200b, ECU 200c, and ECU 200d realize various functions as a result of the processor operating in accordance with the control program. The computer program is configured by combining a plurality of command codes for the processor to realize a predetermined function.

As described above, each of the one or more pieces of software in the in-vehicle network system is executed by one of domain controller 100a, domain controller 100b, ECU 200a, ECU 200b, ECU 200c, and ECU 200d, which are connected to the in-vehicle network.

1.2 Configuration of Domain Controller 100a

Figure 2:
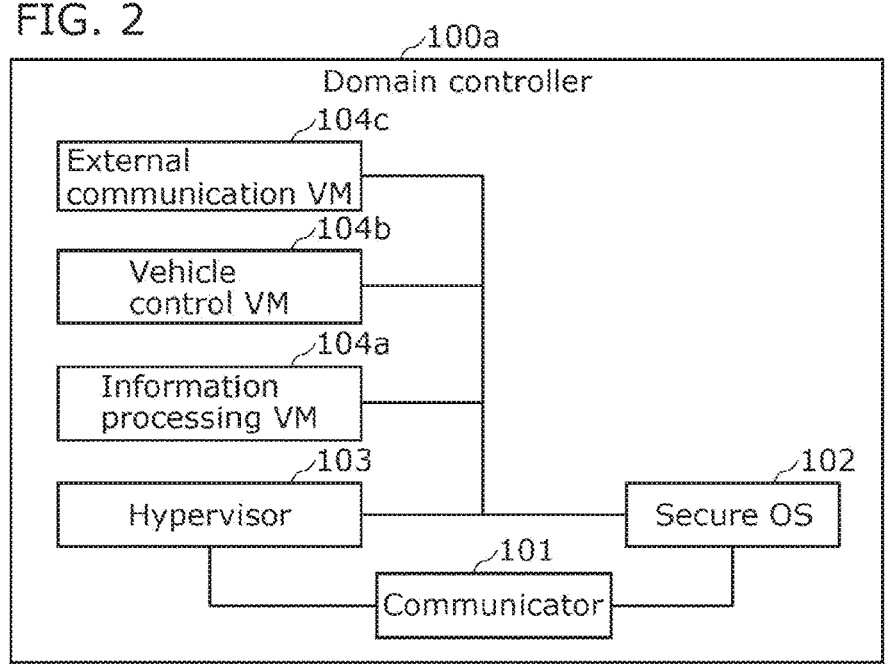
FIG. 2 is a diagram illustrating the configuration of a domain controller according to the embodiment.

FIG. 2 is a diagram illustrating the configuration of domain controller 100a according to the present embodiment. Domain controller 100b has the same configuration and will therefore not be described here.

As illustrated in FIG. 2, domain controller 100a includes communicator 101, secure operating system (OS) 102, hypervisor 103, information processing virtual machine (VM) 104a, vehicle control VM 104b, and external communication VM 104c. In domain controller 100b, the functions and number of VMs may differ, but the plurality of VMs operate in a similar manner. The plurality of VMs included in domain controller 100a are, for example, information processing virtual machine (VM) 104a, vehicle control VM 104b, and external communication VM 104c.

Communicator 101 is a communication interface that communicates with devices connected to the in-vehicle network. Specifically, communicator 101 communicates with other domain controllers, ECUs, and the like. Communicator 101 receives messages from hypervisor 103 or secure OS 102 and transmits the received messages to the in-vehicle network. Communicator 101 also transmits messages received from the in-vehicle network to hypervisor 103 or secure OS 102.

Secure OS 102 is a processor, having a high security level, that operates independently of hypervisor 103. For example, a secure memory space is provided that only secure OS 102 can access, and it is therefore difficult to compromise secure OS 102 from software running in a virtual machine on hypervisor 103. Secure OS 102 has a function of verifying the legitimacy of software running on virtual machines on hypervisor 103. For example, secure OS 102 has a function for verifying the integrity of software running on virtual machines on hypervisor 103, and a function for detecting anomalous states in the operations of such virtual machines.

Hypervisor 103 executes programs that realize virtualization for running virtual machines. Hypervisor 103 runs a plurality of virtual machines realized by information processing VM 104a, vehicle control VM 104b, and external communication VM 104c. In addition, hypervisor 103 relays the communication among the VMs or communicator 101. The program that realizes virtualization for running a virtual machine is an example of software.

Information processing VM 104a is a virtual machine running infotainment-related software. The information processing includes, for example, displaying screens for a navigation system.

Vehicle control VM 104b is a virtual machine running software related to vehicle control. In vehicle control, for example, control signals are transmitted to a body system to operate the temperature setting of an air conditioner, control door locks, control seats, control power windows, and the like.

External communication VM 104c is a virtual machine running software that communicates with the outside of the vehicle. Communication with the outside of the vehicle includes, for example, communication with smartphones, vehicle-to-vehicle communication, communication with over-the-air (OTA) servers, and communication with the Internet.

Information processing VM 104a, vehicle control VM 104b, and external communication VM 104c are not mandatory elements, and may be virtual machines that realize other functions. In other words, domain controller 100a may include one or more virtual machines in which at least one of information processing VM 104a, vehicle control VM 104b, or external communication VM 104c is replaced with a virtual machine that realizes another function; or may include one or more virtual machines in which a virtual machine realizing another function is added to information processing VM 104a, vehicle control VM 104b, and external communication VM 104c; or may include one or more virtual machines from which one or more of information processing VM 104a, vehicle control VM 104b, or external communication VM 104c have been removed.

1.3 Configuration of Secure OS

Figure 3:
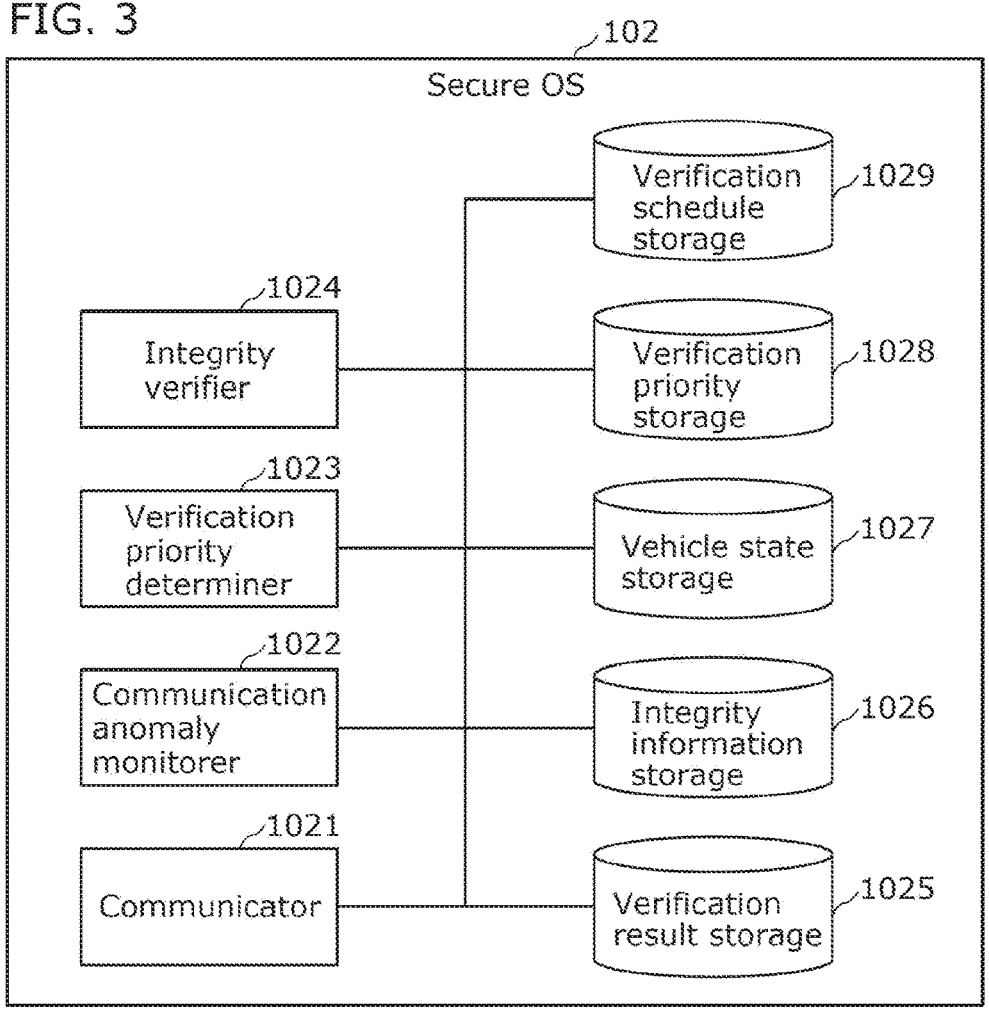
FIG. 3 is a diagram illustrating the configuration of a secure OS according to the embodiment.

FIG. 3 is a diagram illustrating the configuration of secure OS 102 of domain controller 100a according to the present embodiment.

As illustrated in FIG. 3, secure OS 102 includes communicator 1021, communication anomaly monitorer 1022, verification priority determiner 1023, integrity verifier 1024, verification result storage 1025, integrity information storage 1026, vehicle state storage 1027, verification priority storage 1028, and verification schedule storage Communicator 1021 is a communication interface that exchanges messages with communicator 101. Communicator 1021 is a communication interface that exchanges messages with hypervisor 103, information processing VM 104a, vehicle control VM 104b, and external communication VM 104c. Upon receiving a message involved with a change in the vehicle state, communicator 1021 updates the vehicle state, stored in vehicle state storage 1027, corresponding to the message, and notifies verification priority determiner 1023 that the vehicle state stored in vehicle state storage 1027 has been updated.

Communication anomaly monitorer 1022 monitors messages transmitted and received by communicator 1021, and detects whether or not anomalous communication is occurring. Specifically, communication anomaly monitorer 1022 holds rules that specify the amount of data in the messages communicated by each virtual machine at predetermined intervals. When the observed communication amount is at least a predetermined threshold away from the rules held, communication anomaly monitorer 1022 detects that a communication anomaly is occurring in the corresponding virtual machine. Upon detecting that a communication anomaly has occurred in the virtual machine, communication anomaly monitorer 1022 updates the vehicle state stored in vehicle state storage 1027 and notifies verification priority determiner 1023 that the vehicle state stored in vehicle state storage 1027 has been updated.

Verification priority determiner 1023 determines the verification priority to be used to verify the integrity of each virtual machine based on the vehicle state stored in vehicle state storage 1027, and updates the verification priority stored in verification priority storage 1028. The verification priority is set to one of three ranks, e.g., "high", "mid", and "low". The verification timing is determined such that the frequency of the integrity verification increases as the verification priority increases. In other words, the verification priority is an indicator that affects the determination of the verification timing of the integrity verification.

Integrity verifier 1024 verifies the integrity of the virtual machines based on the integrity information of the virtual machines stored in integrity information storage 1026. Integrity verifier 1024 refers to a memory space where the software of a target virtual machine is executed at the integrity verification timing, and calculates a hash value using a hash function algorithm. Integrity verifier 1024 then checks whether the calculated hash value matches the hash value of the virtual machine corresponding to the software, the hash value being stored as the integrity information in integrity information storage 1026. If the hash values match, integrity verifier 1024 determines that the software in the target virtual machine has not been tampered with. If the hash values do not match, integrity verifier 1024 determines that the software in the target virtual machine has been tampered with.

Here, the integrity information for each virtual machine stored in integrity information storage 1026 is an example of first integrity information for guaranteeing the integrity of the software. The first integrity information is a hash value calculated in advance using a hash function algorithm for each piece of software, or each part of a piece of software, that has not been tampered with. For example, the first integrity information may be calculated using the hash function algorithm for all or part of the software when the software is generated, or may be calculated using the hash function algorithm for all or part of the software the first time the software is run.

The hash value calculated using the hash function algorithm from the data obtained by referencing the memory space in which the software of the target virtual machine is executed at the integrity verification timing is an example of second integrity information. The hash function algorithm used to calculate the first integrity information and the hash function algorithm used to calculate the second integrity information are the same.

In this manner, integrity verifier 1024 determines whether the first integrity information, which is for verifying the integrity of the software to be verified and which corresponds to at least a part of the piece of the software corresponding to a verification scope, matches the second integrity information, which is calculated from at least a part of the piece of software at the verification timing. Integrity verifier 1024 determines that the integrity of the software is ensured when the first integrity information and the second integrity information match.

Integrity verifier 1024 updates the integrity verification result for each piece of software, or each part of the piece of software, stored in verification result storage 1025, along with the verification time, using the integrity verification result from the verification of each piece of software, or each part of the piece of software. Integrity verifier 1024 also determines at which timing and for which virtual machine the integrity is to be verified based on a schedule stored in verification schedule storage 1029. Specifically, integrity verifier 1024 determines whether the current time corresponds to one or more schedules stored in verification schedule storage 1029, and if there is a corresponding schedule, verifies the integrity of the virtual machine associated with that schedule.

Integrity verifier 1024 determines the verification timing at which to verify the integrity of each of the plurality of virtual machines based on a verification priority of each virtual machine stored in verification priority storage 1028. If the verification priority of a virtual machine stored in verification priority storage 1028 changes, integrity verifier 1024 determines the verification schedule for the virtual machine corresponding to the changed verification priority based on the changed verification priority. Then, integrity verifier 1024 updates the verification schedule of the corresponding virtual machine stored in verification schedule storage 1029 using the determined verification schedule. Integrity verifier 1024 is an example of a processor that implements functions of a verification schedule determiner.

Verification result storage 1025 stores the result of the verification by integrity verifier 1024.

Integrity information storage 1026 stores the integrity information of each virtual machine. The integrity information is a hash value of the value of the memory space in which each virtual machine executes software.

Vehicle state storage 1027 stores values indicating the state of the vehicle. The vehicle state can include, for example, the status of a connection to an external network, the travel state of the vehicle, the occurrence of anomalous communication, and the like.

Verification priority storage 1028 stores the integrity verification priority of each virtual machine.

Verification schedule storage 1029 stores a verification schedule, which includes the plurality of virtual machines for which integrity verifier 1024 performs integrity verification and the verification timing corresponding to each virtual machine. The verification schedule is information that associates information identifying the virtual machine with the verification timing for that virtual machine, for each of the plurality of virtual machines.

1.4 Configuration of ECUs

Figures 4, 5, 6:
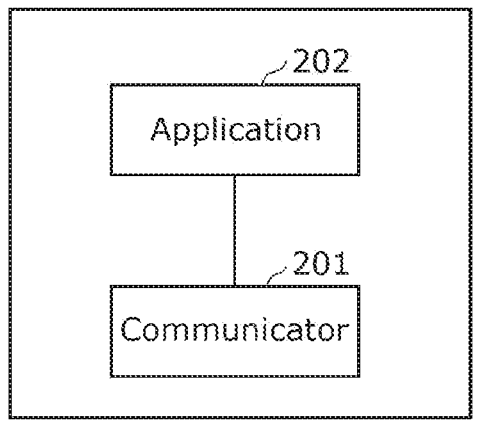
FIG. 4 is a diagram illustrating the configuration of an ECU according to the embodiment.
FIG. 5 is a diagram illustrating an example of a verification result according to the embodiment.
FIG. 6 is a diagram illustrating an example of integrity information according to the embodiment.

FIG. 4 is a diagram illustrating the configuration of ECU 200*a* according to the present embodiment. Note that ECU 200*b*, ECU 200*c*, and ECU 200*d* have the same configuration and will therefore not be described.

As illustrated in FIG. 4, ECU 200*a* includes communicator 201 and application 202.

Communicator 201 is a communication interface that communicates with devices connected to the in-vehicle network. Specifically, communicator 201 communicates with domain controllers 100*a* and 100*b*, other ECUs, and the like. Communicator 201 provides a communication connection to the in-vehicle network and exchanges messages with the in-vehicle network.

Application 202 runs software that implements the functions of the ECU. Application 202, for example, executes control in accordance with messages communicated by communicator 201. Application 202 also transmits a message, including sensor information detected by a sensor connected to the ECU, to other ECUs in order to notify those other ECUs of the sensor information.

1.5 Example of Verification Result

FIG. 5 is a diagram illustrating an example of the verification result from the integrity verification, according to the present embodiment. The verification result from the integrity verification is stored in verification result storage 1025. FIG. 5 illustrates an example in which one row corresponds to the verification result for one virtual machine, and the verification result and the last verification time are stored for each virtual machine (verification target).

"Verification target" indicates the software that realizes the virtual machine subject to integrity verification. In FIG. 5, information processing VM 104a, vehicle control VM 104b, and external communication VM 104c are indicated by their reference signs as the virtual machines to be verified.

"Verification result" indicates whether the integrity verification succeeded or failed. In FIG. 5, "OK" is shown when the integrity verification has succeeded, and "NG" is indicated when the integrity verification has failed.

"Last verification time" indicates that time when the last (i.e., latest) integrity verification was performed for the verification target. The time may be indicated in units of seconds, or in units of other time intervals. In other words, one row in FIG. 5 indicates the verification result for the last integrity verification. The integrity verification result may include not only the last verification result, but also a history of all the verification results, or a history of the verification results performed during a most recent predetermined period.

The verification result for the virtual machine in the first row (information processing VM 104a) indicates that the verification result is "OK", i.e., the integrity verification was successful, and the last verification time is "100 (seconds)".

The verification result for the virtual machine in the second row (vehicle control VM 104b) indicates that the verification result is "OK" and the last verification time is "102 (seconds)".

The verification result for the virtual machine in the third row (external communication VM 104c) indicates that the verification result is "OK" and the last verification time is "103 (seconds)".

1.6 Example of Integrity Information

FIG. 6 illustrates an example of the integrity information according to the present embodiment. The integrity information is stored in integrity information storage 1026. FIG. 6 illustrates an example in which a hash value, which is an example of the integrity information, is stored for each virtual machine to be verified.

The verification target is the same as in FIG. 5.

The hash value is an example of the first integrity information for guaranteeing the integrity of the software that realizes the virtual machine to be verified.

The hash value for the virtual machine in the first row (information processing VM 104a) is indicated as "XXXXXXXX".

The hash value for the virtual machine in the second row (vehicle control VM 104b) is indicated as "YYYYYYYY".

The hash value for the virtual machine in the third row (external communication VM 104c) is indicated as "ZZZZZZZZ".

1.7 Example of Vehicle States

FIG. 7 illustrates an example of the vehicle states according to the present embodiment. The vehicle states are stored in vehicle state storage 1027. In the example in FIG. 7, the vehicle state includes the travel state of the vehicle, an external network connection, and a communication anomaly state.

A state value indicating travel of vehicle 10 is stored as the travel state of the vehicle. The travel state of the vehicle can be, for example, stopped, traveling, performing automated driving, or the like. In FIG. 7, the travel state is indicated as being "stopped".

A state of the external NW connection, which indicates whether there is a connection with an external network, e.g., the Internet or the like, is stored as the external NW connection. In FIG. 7, the state of the external NW connection is "Yes", i.e., vehicle 10 is connected to an external network. "No" indicates that vehicle 10 is not connected to an external network. Note that the state of the external NW connection need not be the two values of "yes" and "no", and may instead be expressed by the type of the connection destination, and address of the connection destination, or the like. The type of the connection destination may be, for example, the Internet, a vehicle-to-vehicle network, a dedicated server, or the like.

A result of a communication anomaly detected by communication anomaly monitorer 1022 is stored as the communication anomaly. The communication anomaly can include information indicating the detection location, e.g., the virtual machine from which a message was transmitted. In FIG. 7, the state of the communication anomaly is indicated as "no", which indicates that no communication anomaly has occurred.

1.8 Example of Verification Priorities

FIG. 8 illustrates an example of verification priorities according to the present embodiment. The verification priorities are stored in verification priority storage 1028. FIG. 8 illustrates an example in which a verification priority is stored for each virtual machine to be verified.

The verification target is the same as in FIG. 5.

"Verification priority" indicates a priority at which to verify the integrity. The verification schedule is determined such that a verification target having a higher verification priority is subject to integrity verification immediately or more frequently. For example, the integrity is verified at 10-second intervals if the verification priority is "high", the integrity is verified at 30-second intervals if the verification priority is "mid", and the integrity is verified at 60-second intervals if the verification priority is "low".

The verification priority for the virtual machine in the first row (information processing VM 104a) is "low".

The verification priority for the virtual machine in the second row (vehicle control VM 104b) is "mid".

The verification priority for the virtual machine in the final row (external communication VM 104c) is "high".

1.9 Example of Verification Schedule

FIG. 9 illustrates an example of the verification schedule according to the present embodiment. The verification schedule is stored in verification schedule storage 1029. FIG. 9 illustrates an example in which a verification time, which serves as the next verification timing, is stored for each virtual machine to be verified. In other words, the verification schedule is determined by adding a time interval of the verification frequency corresponding to the verification priority to the time at which the integrity was previously verified for the virtual machine, for each virtual machine to be verified.

The next integrity verification time for the virtual machine in the first row (information processing VM 104a) is "160 (seconds)".

The next integrity verification time for the virtual machine in the second row (vehicle control VM 104b) is "130".

The next integrity verification time for the virtual machine in the third row (external communication VM 104c) is "110".

Note that the integrity verification time may be determined when the previous integrity verification ends, or may be determined when the priority is changed. Additionally, the integrity verification time may be set to a plurality of times for a single virtual machine (a single piece of software). In this case, the next and subsequent integrity verification times may be updated when the priority is changed.

1.10 Operation Sequence 1 of Secure OS

Figure 10:
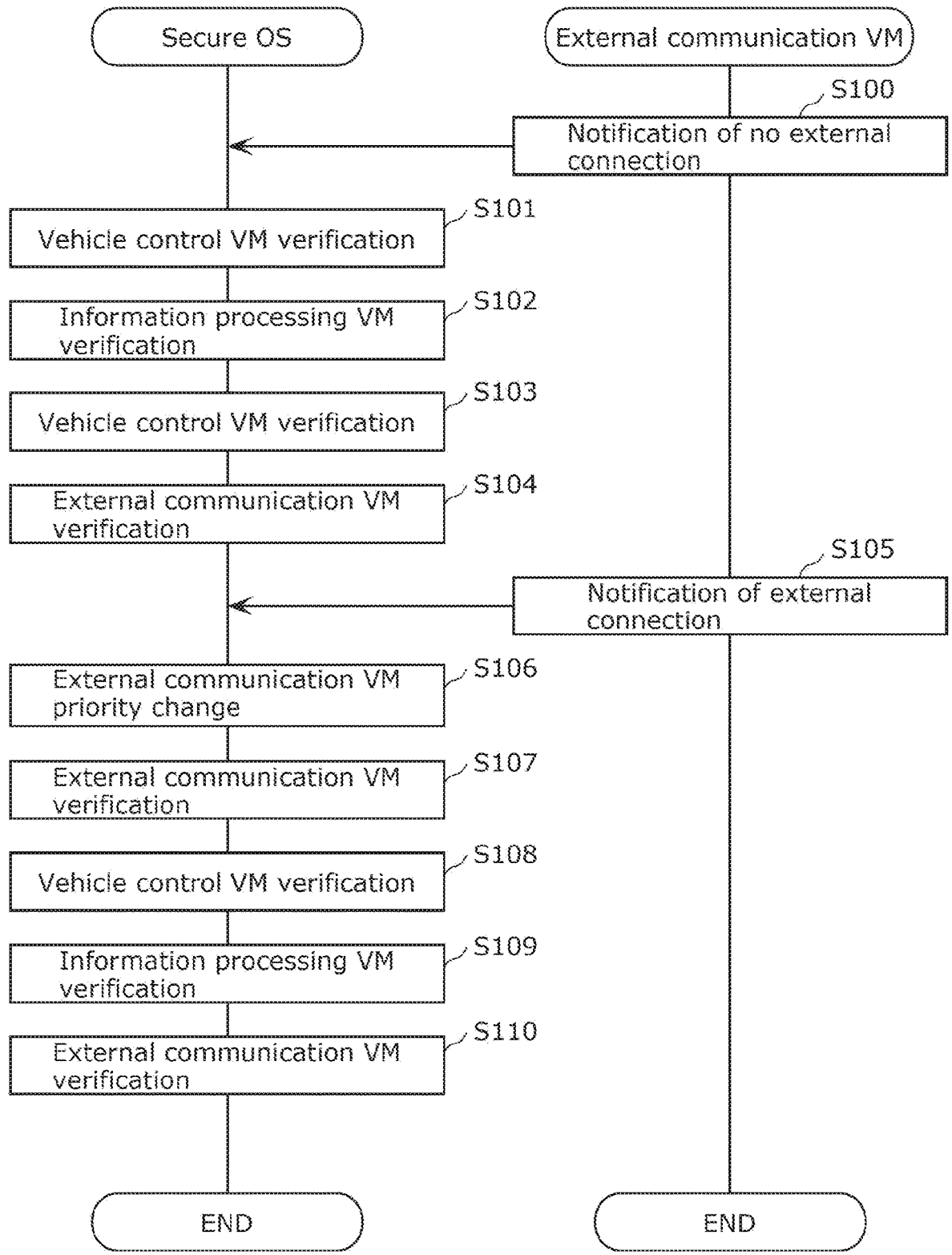
FIG. 10 is a diagram illustrating an operation sequence of the secure OS when the vehicle state changes, according to the embodiment.

FIG. 10 is an operation sequence by secure OS 102 when the external NW connection changes, according to the present embodiment.

External communication VM 104c notifies secure OS 102 that the external NW connection is "no" (S100).

Secure OS 102 verifies the integrity of vehicle control VM 104b, information processing VM 104a, vehicle control VM 104b, and external communication VM 104c in that order based on the verification schedule stored in verification schedule storage 1029 (S101, S102, S103, S104).

External communication VM 104c notifies secure OS 102 that external NW connection has changed from "no" to "yes" (S105).

Secure OS 102 changes the verification priority of the integrity verification for external communication VM 104c in accordance with the change in the external NW connection (S106). When the verification priority changes, secure OS 102 determines the verification frequency in accordance with the verification priority, and determines the verification schedule of external communication VM 104c based on the determined verification frequency. Secure OS 102 updates the verification schedule for external communication VM 104c according to the determined verification schedule.

Secure OS 102 verifies the integrity of external communication VM 104c, vehicle control VM 104b, information processing VM 104a, and external communication VM 104c in that order, based on the updated verification schedule (S107, S108, S109, S110). In this manner, the verification schedule is changed such that integrity verification is executed at a higher frequency in response to the verification priority of external communication VM 104c changing to "high", and thus the integrity of external communication VM 104c is verified at a higher frequency than when external NW connection is "no".

1.11 Operation Sequence 2 of Secure OS

Figure 11:
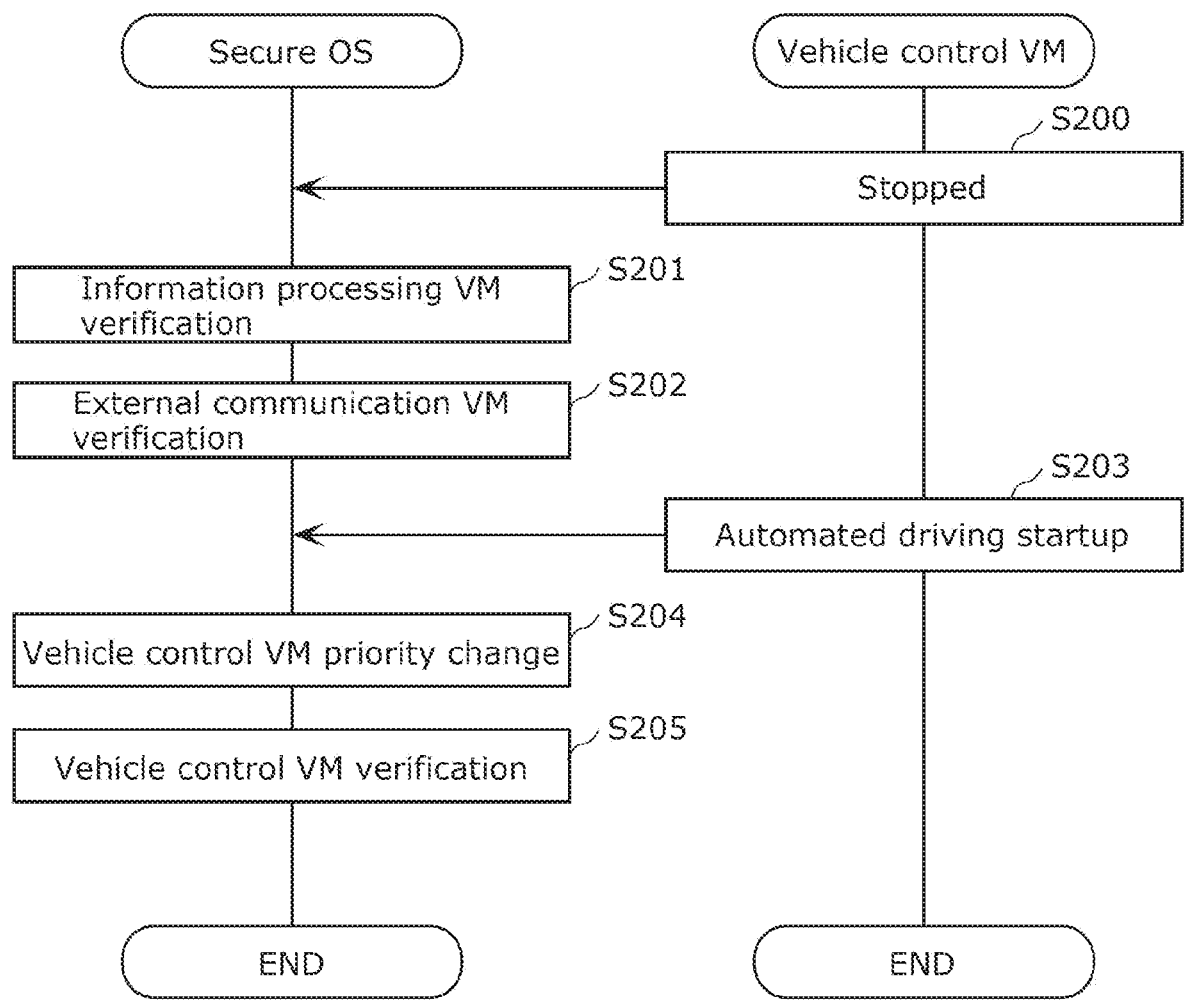
FIG. 11 is a diagram illustrating an operation sequence of the secure OS when the vehicle state changes, according to the embodiment.

FIG. 11 is an operation sequence by secure OS 102 when the travel state among the vehicle states changes, according to the present embodiment.

Vehicle control VM 104b notifies secure OS 102 that the travel state among the vehicle states is "stopped" (S200).

Secure OS 102 verifies the integrity of information processing VM 104a and external communication VM 104c in that order based on the verification schedule stored in verification schedule storage 1029 (S201, S202).

Vehicle control VM 104b notifies secure OS 102 that the travel state among the vehicle states has changed to "performing automated driving" (S203).

Secure OS 102 changes the verification priority of the integrity verification for vehicle control VM 104b to "high" in response to the change in the travel state among the vehicle states (S204). When the verification priority changes, secure OS 102 determines the verification frequency in accordance with the verification priority, and determines the verification schedule of vehicle control VM 104b based on the determined verification frequency. Secure OS 102 updates the verification schedule for vehicle control VM 104b according to the determined verification schedule.

Secure OS 102 immediately verifies the integrity of vehicle control VM 104b based on the updated verification schedule (S205).

1.12 Operation Sequence 3 of Secure OS

Figure 12:
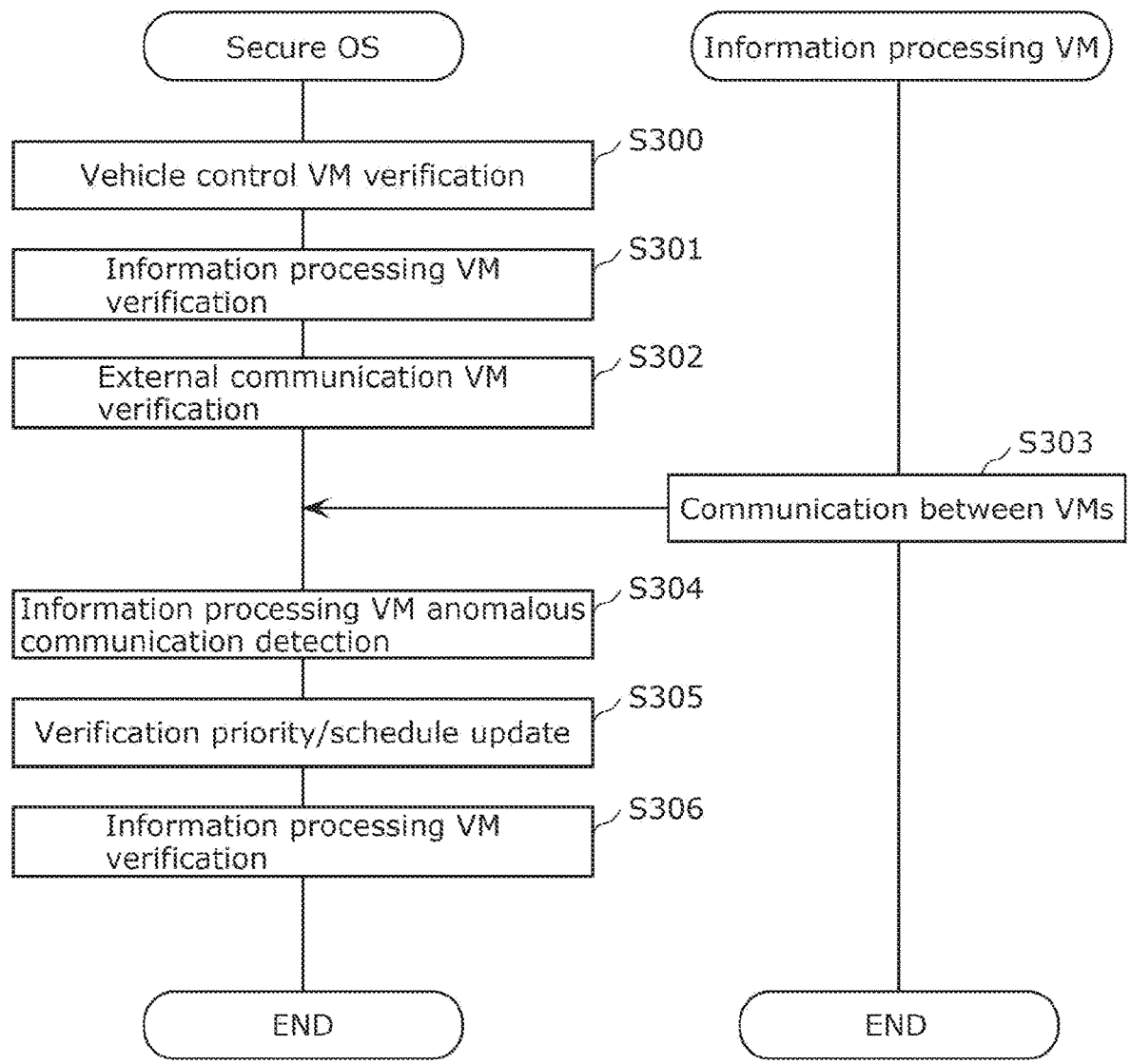
FIG. 12 is a diagram illustrating an operation sequence of the secure OS when the vehicle state changes, according to the embodiment.

FIG. 12 is an operation sequence by secure OS 102 when the communication anomaly among the vehicle states changes, according to the present embodiment.

Secure OS 102 verifies the integrity of vehicle control VM 104b, information processing VM 104a, and external communication VM 104c in that order based on the verification schedule stored in verification schedule storage 1029 (S300, S301, S302).

Information processing VM 104a communicates with another virtual machine (S303).

Secure OS 102 observes the communication of information processing VM 104a and detects the occurrence of anomalous communication (S304).

Secure OS 102 changes the verification priority of the integrity verification for the corresponding information processing VM 104a to "high" in response to the anomalous communication being detected (S305). When the verification priority changes, secure OS 102 determines the verification frequency in accordance with the verification priority, and determines the verification schedule of information processing VM 104a based on the determined verification frequency. Secure OS 102 updates the verification schedule for information processing VM 104a according to the determined verification schedule.

Secure OS 102 immediately verifies the integrity of information processing VM 104a based on the updated verification schedule (S306).

1.13 Secure OS Processing Flowchart

Figure 13:
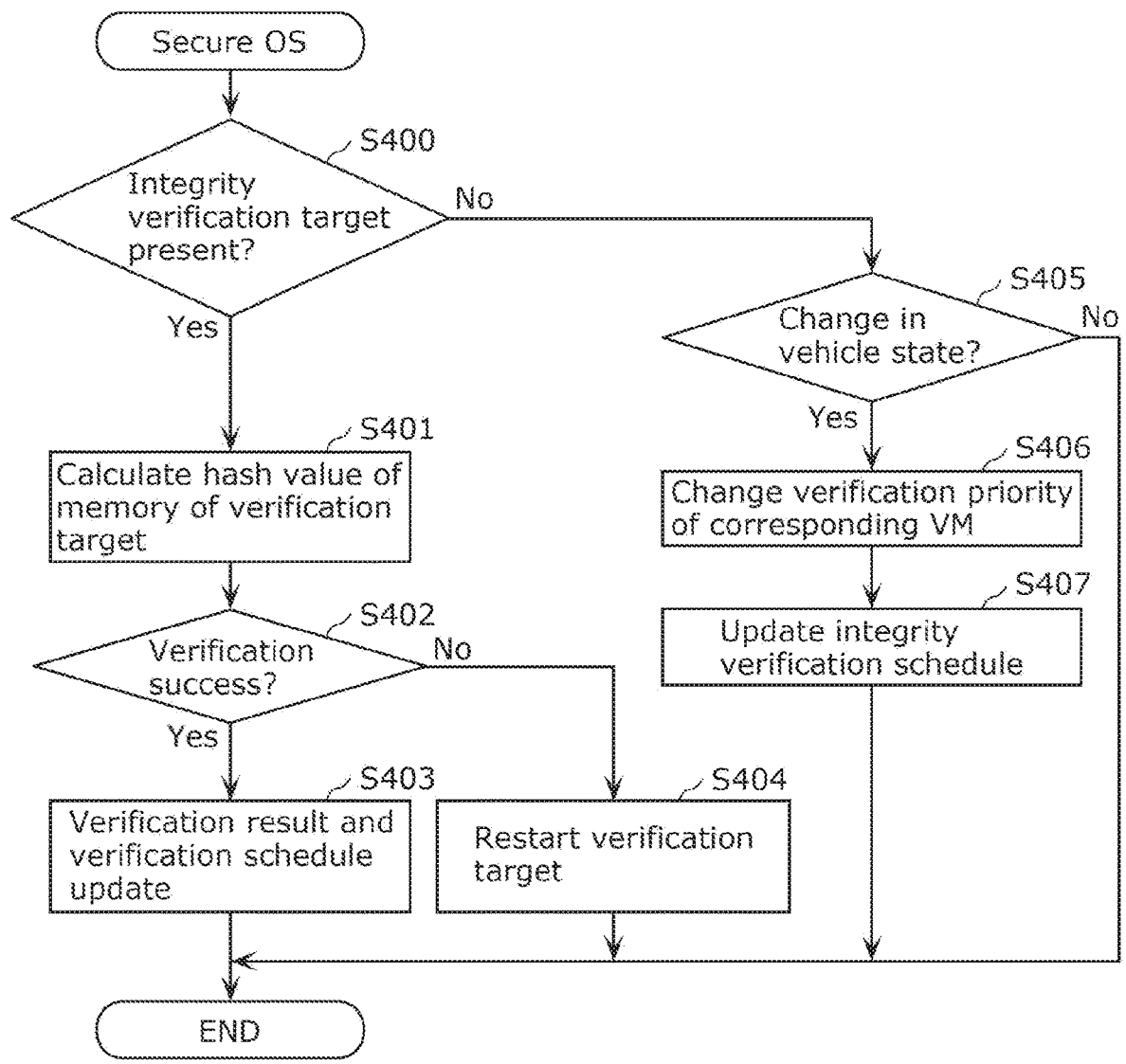
FIG. 13 is a flowchart illustrating integrity verification processing by the secure OS according to the embodiment.

FIG. 13 is a flowchart illustrating an example of processing by secure OS 102.

Secure OS 102 refers to the verification schedule stored in verification schedule storage 1029, and confirms whether there is a virtual machine for which the integrity is to be verified (S400). Specifically, secure OS 102 determines whether there is a virtual machine to be verified which has a verification schedule in which the integrity verification is to be executed at the current time. Secure OS 102 executes step S401 if there is a virtual machine to be verified for the integrity verification (Yes in S400), and executes step S405 if not (No in S400).

Secure OS 102 refers to the memory in which the virtual machine to be verified is run, and calculates a hash value by applying a hash function algorithm to a data value included in the memory (S401).

Secure OS 102 verifies the integrity by determining whether the hash value calculated in step S401 matches the integrity information of the virtual machine to be verified, which is stored in integrity information storage 1026 (S402). If the hash value and the integrity information match, i.e., if the verification is successful (Yes in S402), the verification result stored in verification result storage 1025 and the integrity verification schedule stored in verification schedule storage 1029 are updated (S403), after which the processing ends. If the integrity verification has failed (No in S402), secure OS 102 restarts the virtual machine to be verified (S404), and then ends the processing.

Secure OS 102 determines whether the vehicle state stored in vehicle state storage 1027 has changed (S405). If there has been a change (Yes in S405), secure OS 102 executes step S406. If there has not been a change (No in S405), secure OS 102 ends the processing.

Secure OS 102 changes the verification priority of the integrity verification for the target virtual machine in accordance with the change in the vehicle state (S406). Note that the method for changing the verification priority will be described in detail with reference to FIG. 14.

Secure OS 102 updates the verification schedule for the integrity verification, stored in verification schedule storage 1029, in response to the change in the verification priority (S407), and then ends the processing.

1.14 Flowchart for Changing Verification Priority by Secure OS

Figure 14:
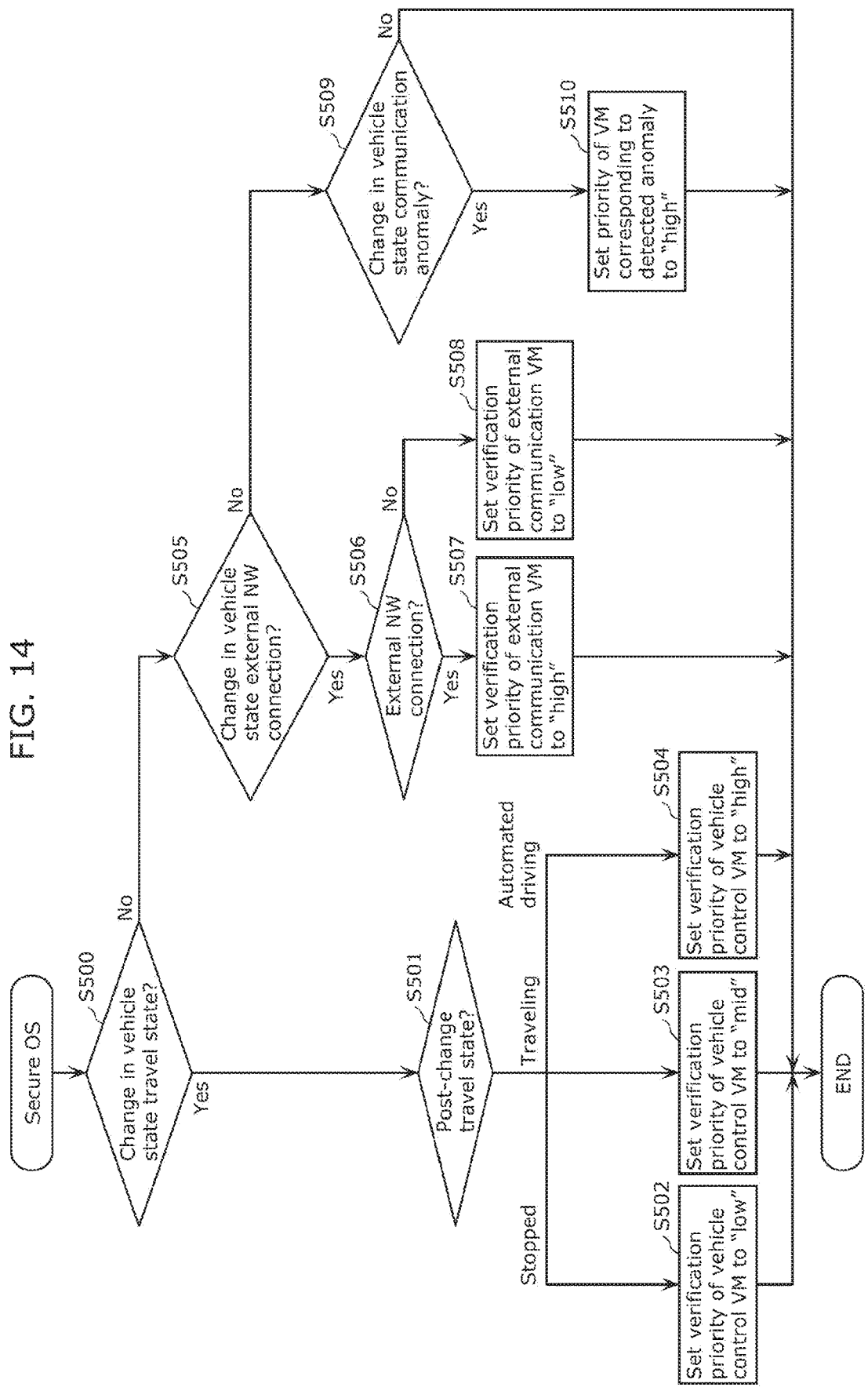
FIG. 14 is a flowchart illustrating verification priority changing processing by the secure OS according to the embodiment.

FIG. 14 is a flowchart illustrating verification priority changing processing for the integrity verification, performed by secure OS 102. The verification priority changing processing for the integrity verification corresponds to a flowchart for the specific processing performed in step S406 of FIG. 13.

Secure OS 102 determines whether it is the travel state that has changed among the vehicle states stored in vehicle state storage 1027 (S500). In other words, secure OS 102 determines whether the travel state has changed. If the change in the vehicle state is the travel state (Yes in S500), secure OS 102 executes step S501. If the travel state has not changed (No in S500), secure OS 102 executes step S505.

If the travel state has changed (Yes in S500), secure OS 102 executes processing in accordance with the travel state (S501). If the travel state has changed to "stopped" from another state ("stopped" in S501), secure OS 102 sets the verification priority for the integrity verification of vehicle control VM 104*b* to "low" and updates the verification priority to "low" in verification priority storage 1028 (S502). If the travel state has changed to "traveling" from another state ("traveling" in S501), secure OS 102 sets the verification priority of the integrity verification for vehicle control VM 104*b* to "mid" and updates the verification priority to "mid" (S503). If the travel state has changed to "automated driving" from another state ("automated driving" in S501), secure OS 102 sets the verification priority of the integrity verification for vehicle control VM 104*b* to "high" and updates the verification priority to "high" (S504). Secure OS 102 ends the processing after the priority is updated.

If it is not the travel state that has changed among the vehicle states (No in S500), secure OS 102 determines whether it is the state of the external NW connection that has changed among the vehicle states (S505). Secure OS 102 executes step S506 if the change in the vehicle state is a change in the state of the external NW connection (Yes in S505), and executes step S509 if not (No in S505).

Secure OS 102 confirms whether the state of the external NW connection has changed from "no" to "yes" (S506). If the state of the external NW connection has changed to "yes" (Yes in S506), secure OS 102 sets the verification priority of the integrity verification for external communication VM 104*c* to "high" (S507), updates the verification priority to "high", and ends the processing. If the state of the external NW connection has changed from "yes" to "no" (No in S506), secure OS 102 sets the verification priority of the integrity verification for external communication VM 104*c* to "low" (S508), updates the verification priority to "low", and ends the processing.

If it is not the state of the external NW connection that has changed among the vehicle states (No in S505), secure OS 102 determines whether it is a communication anomaly that has changed among the vehicle states (S509). If the change in the vehicle state is a communication anomaly (Yes in S509), secure OS 102 sets the verification priority of the virtual machine corresponding to the details of the detected communication anomaly to "high" (S510), updates the verification priority of that virtual machine to "high", and then ends the processing. If the change in the vehicle state is not a communication anomaly (No in S509), secure OS 102 ends the processing.

1.15 Effects of Embodiment

Domain controller 100*a* according to the present embodiment is an example of an integrity verification device that verifies the integrity of software of a virtual machine in an in-vehicle network system. Each of a plurality of pieces of software corresponding to a plurality of virtual machines is executed by domain controller 100*a*, which is connected to the in-vehicle network system. Domain controller 100*a* determines the verification timing at which to verify the integrity of each of the plurality of pieces of software. For each piece of software among the plurality of pieces of software, domain controller 100*a* determines, at the verification timing determined for the piece of software, whether first integrity information matches second integrity information, and determines that the integrity of the piece of software is ensured when the first integrity information and the second integrity information match, the first integrity information being information for verifying the integrity of the piece of software and that corresponds to the piece of software corresponding to a verification scope, and the second integrity information being information calculated from at least a part of the piece of software at the verification timing. Domain controller 100*a* determines a verification priority that affects the determining of the verification timing.

Through this, the integrity of the software to be verified, which is determined in an adaptive manner, can be verified based on the verification timing determined in accordance with the verification priority. In other words, it is possible that the integrity of high-risk software can be verified preferentially. This makes it possible to suppress situations in which the effects of verifying the integrity of the plurality of pieces of software are reduced, even if the frequency of verifying the integrity of low-risk software is reduced. Accordingly, the processing load involved in verifying the integrity of the software can be reduced in a system which requires real-time performance.

Additionally, domain controller 100*a* determines the verification timing of one piece of software among the plurality of pieces of software such that the verification frequency for the one piece of software increases as the verification priority of the one piece of software increases. This makes it possible to verify the integrity of software at a higher frequency as the priority increases, which has an effect of improving security.

Furthermore, domain controller 100*a* updates the verification schedule of a virtual machine based on the verification priority of that virtual machine. Through this, by assigning a higher verification priority to a high-risk virtual machine, domain controller 100*a* can verify the integrity of that virtual machine at a higher frequency.

Additionally, domain controller 100*a* updates the verification priorities of the software according to the state of a vehicle in which the in-vehicle network system is installed. Through this, the verification priority can be determined according to the risk of the virtual machine, which changes according to the vehicle state, and this makes it possible to adaptively verify the integrity of the virtual machine.

Here, the vehicle state includes at least one of being stopped, traveling, performing automated driving, being in a diagnostic mode, charging, updating, and communicating/not communicating with an external network. Through this, the priority can be determined adaptively for vehicle states in which the function or risk of the software changes, which is effective in achieving efficient verification.

Additionally, in accordance with the vehicle state, domain controller 100*a* changes the verification priority of software for which content of the processing by the software changes in accordance with the vehicle state. This makes it possible to change the verification priority for, for example, software for which the function or risk changes in accordance with the vehicle state, which is effective in achieving efficient integrity verification.

Additionally, the plurality of pieces of software include a plurality of pieces of software each implementing one of a plurality of virtual machines. Through this, the verification priorities can be changed for a plurality of pieces of software that realize a plurality of virtual machines, which is effective in achieving efficient integrity verification.

Additionally, domain controller 100*a* detects an anomalous state indicating at least one of a communication anomaly pertaining to the plurality of pieces of software and a usage amount anomaly pertaining to a memory and a processor included in domain controller 100*a*. Domain controller 100*a* increases the verification priority corresponding to software, among the plurality of pieces of software, for which an anomalous state is detected. This makes it possible to change the priority of the integrity verification for software according to an anomalous state in the in-vehicle network system, which is effective in increasing the security in high-risk situations.

In this manner, domain controller 100*a* according to the present embodiment can, in an in-vehicle network system, adaptively verify the integrity of virtual machines having different functions or security levels (risks) by changing the verification priorities in accordance with the vehicle state.

Other Variations

Although the present disclosure has been described based on the aforementioned embodiments, the present disclosure is of course not limited to the embodiments discussed above. The present disclosure is also inclusive of the following cases.

(1) Although the physical layer, the data link layer, and the like of the in-vehicle network are not particularly limited in the foregoing embodiment, Ethernet (registered trademark) can be used; the configuration is not limited thereto, however, and CAN (registered trademark), CAN-FD (Flexible-Datarate), Ethernet LIN, or FlexRay (registered trademark) may be used, or a combination of a plurality of specific examples of physical layers, data link layers, and the like of such in-vehicle networks may be used.

(2) In the foregoing embodiment, integrity verification priority determiner 1023 is provided in secure OS 102 within domain controller 100*a*, but verification priority determiner 1023 need not be provided in secure OS 102. Additionally, verification priority determiner 1023 may be outside domain controller 100*a*, and the verification priority may be communicated to domain controller 100*a* over a network. This makes it possible to set the verification priority through external communication, which in turn makes it possible to determine the verification priority more flexibly.

(3) The foregoing embodiment described three levels for the verification priority, namely "high", "mid", and "low", but the method of expressing the verification priority is not limited thereto. The verification priority may be expressed as a numerical value, for example, and priority relationships may be indicated by the magnitude relationships between the numerical values. This makes it possible to express the verification priorities in detail, which in turn makes it possible to realize the integrity verification processing in a more flexible manner.

(4) In the foregoing embodiment, integrity information storage 1026 stores a hash value of a value contained in the execution memory of the virtual machine as the integrity information, but the integrity information is not limited thereto. Integrity information storage 1026 may, for example, store a hash value for each application, configuration file, or the like in the virtual machine, or may hold hash values calculated from some values of the application, the configuration file, or the like. In other words, the software subject to the integrity verification need not be a unit of software that implements a single function, and may instead be a part of that software. This makes it possible to limit the target of the integrity verification, which is effective in shortening the verification time.

(5) In the foregoing embodiment, the hash value algorithm used to calculate the integrity information was not particularly limited, and for example, Secure Hash Algorithm (SHA) 1, SHA-2, SHA-3, or the like may be used, or another cryptographic hash function, keyed hash function, or the like may be used.

(6) In the foregoing embodiment, the integrity information stored in integrity information storage 1026 may be stored in a memory area which is difficult to tamper with. Additionally, updating the integrity information may be limited to being performed by a function having special privileges (or a virtual machine, ECU, or the like having special privileges). Additionally, the integrity of the integrity information may be protected by a digital signature, and the integrity of the integrity information may be verified by verifying the digital signature at startup. This makes it possible to prevent a situation where the detection of unauthorized software is avoided by tampering with the integrity information.

(7) In the foregoing embodiment, communication anomaly monitorer 1022 was provided in secure OS 102, but communication anomaly monitorer 1022 need not be provided within secure OS 102 or domain controller 100*a*, and may instead be provided outside the domain controller. In this case, domain controller 100*a* may receive a result from communication anomaly monitorer 1022 provided outside, and update the vehicle state in vehicle state storage 1027.

(8) In the foregoing embodiment, verification result storage 1025 stores the verification result and the last verification time as the verification result, but a hash value from the time of verification may be stored as well.

(9) The foregoing embodiment described three types of vehicle states, namely a travel state, a state of the external NW connection, and the occurrence of a communication anomaly, but not all of these may be included. Vehicle states aside from these may also be included. The vehicle states may include, for example, a charging state, a diagnostic mode state, a vehicle update state, and the like. This makes it possible to calculate the priority more adaptively in accordance with state in which the security risk for the vehicle is high, related virtual machines or software, and the like, and is therefore effective.

(10) In the foregoing embodiment, communication anomaly monitorer 1022 detected whether or not the communication amount of a virtual machine deviates from a predetermined rule in order to detect a communication anomaly in the corresponding virtual machine, but instead, the communication anomaly may be detected by observing the network. For example, communication anomaly monitorer 1022 may detect a communication anomaly in the in-vehicle network to which domain controller 100*a* is connected. At this time, verification priority determiner 1023 may determine there is an increased risk of an attack on the virtual machine that uses information on that in-vehicle network, and perform processing for increasing the priority of the corresponding virtual machine. For example, when domain controller 100*a* is connected to a CAN and vehicle control VM 104*b* is using information on the CAN, the verification priority of vehicle control VM 104*b* may be increased when a communication anomaly is detected on the CAN.

(11) Although the foregoing embodiment described an example in which communication anomaly monitorer 1022 detects a communication anomaly in the virtual machine, anomalies in the virtual machine may be detected through host monitoring instead of using communication anomaly monitorer 1022. For example, with host monitoring, anomalous behavior may be detected based on file accesses made by the virtual machine, an application, or the like, resource usage amounts such as memory and CPU utilization, and the like. Furthermore, the verification priorities may be determined such that when anomalous behavior is detected, the verification priority of the corresponding virtual machine is increased. This makes it possible to set the verification priorities taking into account anomalies in virtual machines, applications, and the like, which in turn makes it possible to perform the integrity verification efficiently.

Figure 15:
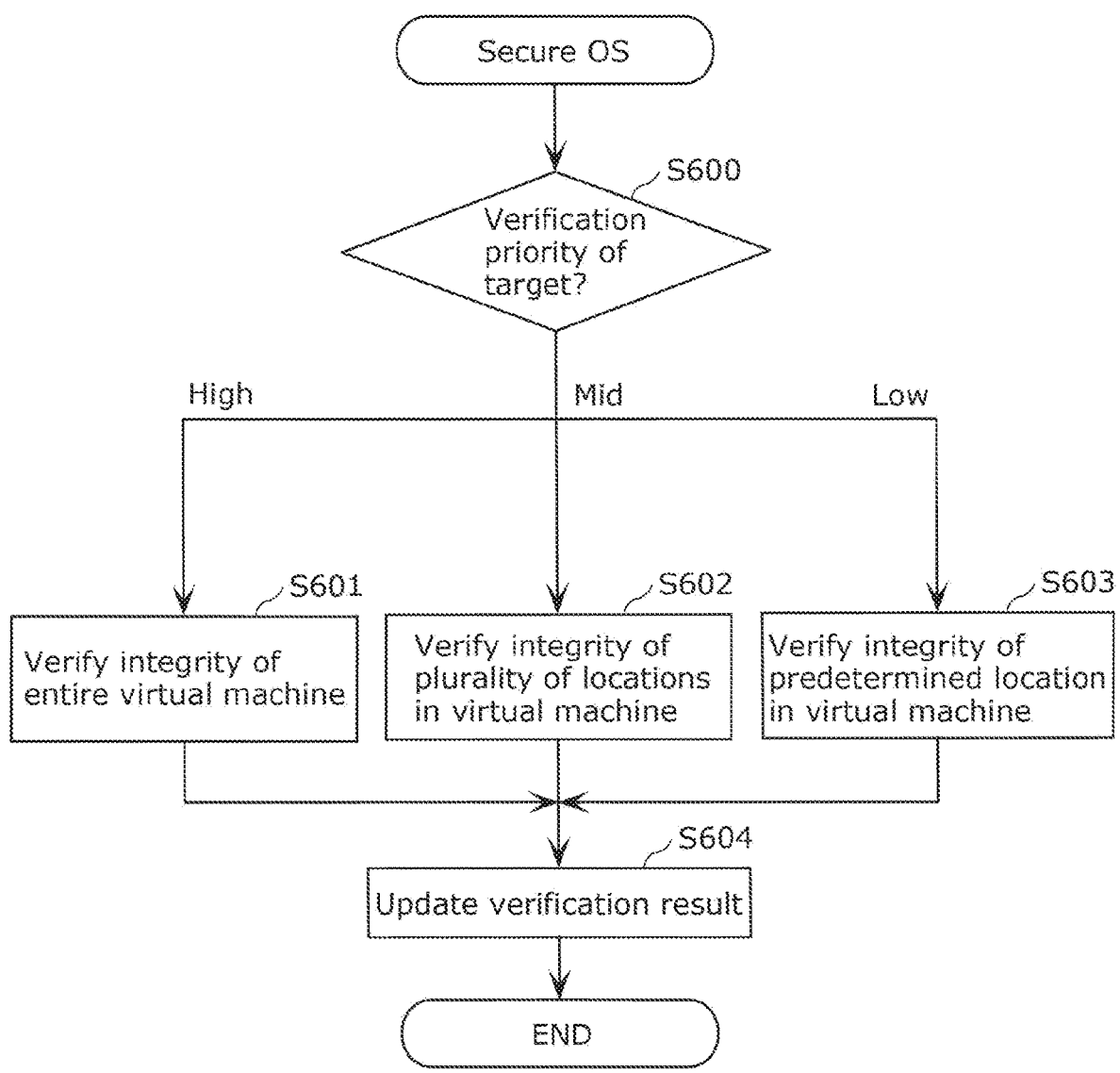
FIG. 15 is a flowchart illustrating a variation during integrity verification by the secure OS according to another variation.

(12) Although the foregoing embodiment described an example in which the integrity verification frequency is increased as the verification priority increases, the configuration is not limited thereto. For example, when the verification priority is increased, the integrity of the software may be verified immediately, and after the integrity is verified, the verification priority which was increased may be lowered. Additionally, the verification scope of the target software may be broadened according to the verification priority. FIG. 15 is a flowchart illustrating a variation during integrity verification.

Secure OS 102 determines the verification priority of the target software at the verification timing for the integrity verification (S600). If the verification priority is "high", a hash value is calculated for the entire virtual machine, i.e., from the values in the entire execution memory of the virtual machine, and whether the hash value matches integrity information stored in advance and corresponding to the entire virtual machine is confirmed (S601). If the verification priority is "mid", secure OS 102 selects a plurality of locations of the virtual machine, i.e., a plurality of locations in the execution memory of the virtual machine, calculates hash values for each thereof, and compares those hash values with integrity information stored in advance and corresponding to the plurality of locations (S602). Note that the plurality of locations of the virtual machine are parts of the virtual machine. If the verification priority is "low", secure OS 102 selects a predetermined location of the virtual machine, i.e., a predetermined single location in the execution memory of the virtual machine, calculates a hash value thereof, and compares that hash value with integrity information stored in advance and corresponding to the predetermined single location (S603). At this time, in addition to that hash value calculated for the entire memory space in which the virtual machine is executed, integrity information storage 1026 stores an address of a predetermined memory space and a hash value corresponding to a data value of that predetermined memory space. Through this, when the priority is low, the integrity is verified only for the predetermined memory space, which is a part of the software that realizes the virtual machine, and this makes it possible to verify the integrity of the software efficiently.

Note that the plurality of locations and the predetermined single location in the execution memory of the virtual machine may be fixed verification scopes set in advance. Additionally, the plurality of locations and the predetermined single location in the execution memory of the virtual machine may be varied in response to changes in the vehicle state. For example, the verification scope may include a plurality of verification locations, a verification location that is affected by changes in the vehicle state may be selected from among the plurality of verification locations, and the integrity verification may be executed only for the selected verification location. For example, integrity verification may be executed for a first verification location when "travel state" changes, integrity verification may be executed for a second verification location when "external NW connection" changes, and integrity verification may be executed for a third verification location when "communication anomaly" changes.

When the integrity verification is complete, secure OS 102 updates the verification result (S604) and ends the processing.

In this manner, domain controller 100*a* may change the verification scope of the software according to the verification priority. Through this, the integrity of part of the software to be verified, which is determined in an adaptive manner, can be verified based on the verification scope determined in accordance with the verification priority. In other words, it is possible that the integrity of a high-risk part of software can be verified preferentially. This makes it possible to suppress situations in which the effects of verifying the integrity of the software are reduced, even if the verification scope for verifying the integrity of low-risk software is reduced. Accordingly, the processing load involved in verifying the integrity of the software can be reduced in a system which requires real-time performance.

Additionally, domain controller 100*a* determines the verification scope of the software such that the verification scope broadens as the verification priority of the software increases. This makes it possible to verify the integrity of software over a broader verification scope as the priority increases, which has an effect of improving security.

Note that the verification scope is not limited to part or all of the software, and there may be a plurality of pieces of software, or a single piece of software, subject to the verification.

Figure 16:
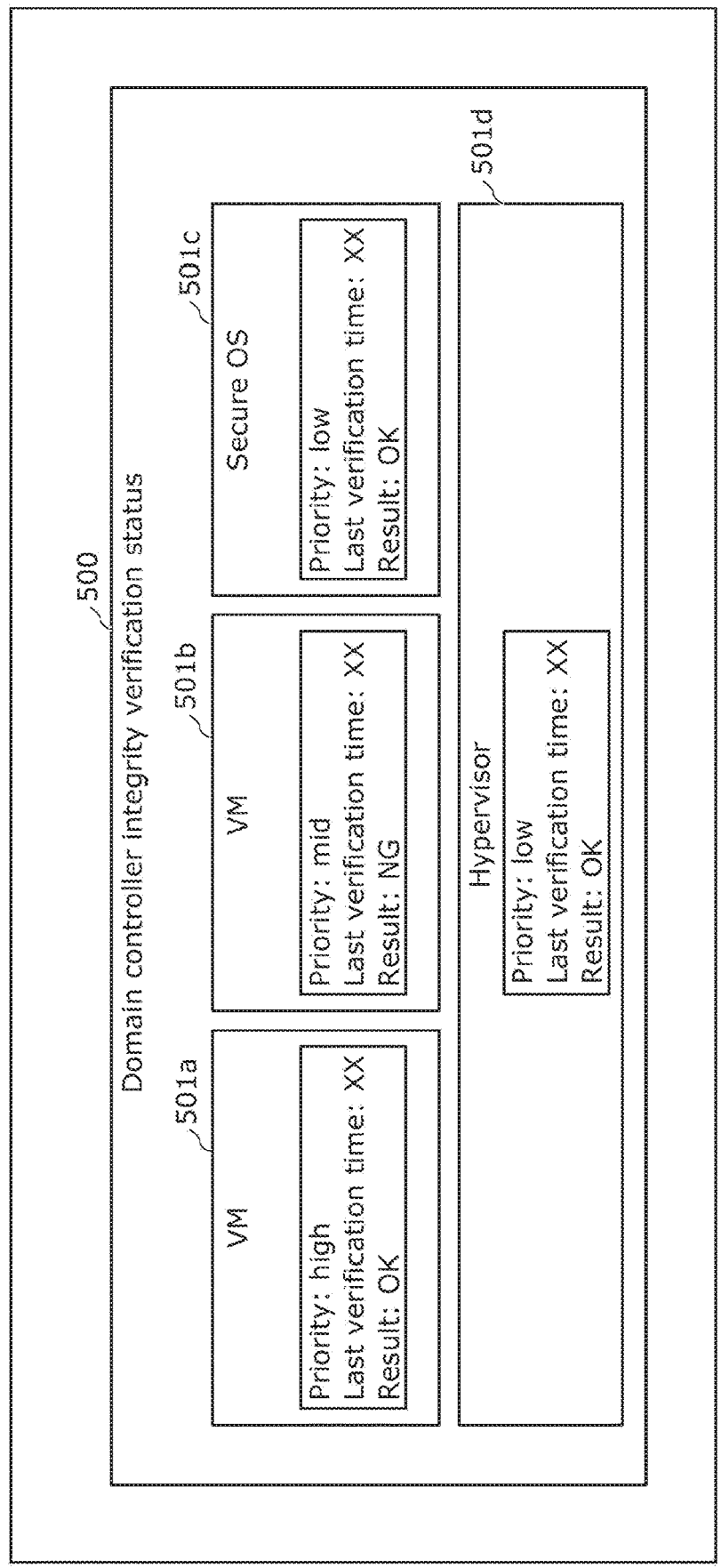
FIG. 16 is a diagram illustrating an example of the display of an integrity verification status of a monitoring server according to another variation.

(13) Although the foregoing embodiment describes an example in which the verification target is restarted when the integrity verification fails, the processing performed when the verification fails is not limited to restarting the verification target. For example, the hash value of the verification target may be stored in a log, a notification of an anomaly may be made to a monitoring server on an external network, another ECU or domain controller in the vehicle, or the like, the verification priority of another virtual machine that communicates with the verification target may be increased, or the like. FIG. 16 illustrates an example of a user interface used when the integrity verification result is confirmed by a monitoring server on an external network. In FIG. 16, frame 500 indicating the integrity information of the target device (the domain controller) is displayed in a display. In frame 500, verification results (501a, 501b, 501c, and 501d) for each domain controller constituent element are displayed. The verification priority, the last verification time, and the verification result are displayed as the verification result.

(14) In the foregoing embodiment, the verification priority is set for each virtual machine included in the domain controller, but the target for which the verification priority is set is not limited to a virtual machine. The target for the setting may be hypervisor 103 or secure OS 102, for example. Additionally, the verification priority may be set for each application running on the virtual machine, each process, each file, or the like, or may be set for each ECU, each domain controller, or each vehicle. In this manner, the one or more pieces of software subject to integrity verification may be any one of an overall piece of software run on an electronic control unit, a hypervisor serving as a virtualization platform run on the electronic control unit, an operating system, a virtual machine, an application, a process, or a file. This makes it possible to classify the software to be verified in detail, which is effective in achieving efficient integrity verification.

(15) In the foregoing embodiment, the VM to be subject to integrity verification is classified into one of three types, namely vehicle control, information processing, and external communication, but the classification method is not limited thereto, and the classification may be performed according to the function realized by the software, the security level, the function safety level, the level of sensitive information handled, or the like. For example, vehicle control may be classified in association with actuators such as those related to engine control, steering control, and brake control, or may be classified in association with functions for realizing automated driving, cruise control, automated parking, and collision mitigation braking. This makes it easy to change the priority of related software in response to a change in the vehicle state.

Additionally, the verification priority may be set in association with a function safety level of the corresponding hardware/software, e.g., an Automotive Safety Integrity Level (ASIL). This makes it possible to selectively verify targets for which security risks are linked to safety risks. The verification priority may also be set in association with communication interfaces for software or hardware. For example, for software having an external network connection interface, the verification priority may be set higher in accordance with the status of an external network connection, under the assumption that there will be an increased security risk. This makes it possible to set the priority in accordance with risks that change according to the communication status of the vehicle and the software.

(16) In the foregoing embodiment, secure OS 102 of domain controller 100a determined the verification timing of the integrity verification, executed the integrity verification, and determined the verification priority, but this processing may be executed by the other domain controller 100b, or may be executed by another ECU. Additionally, the software to be verified need not only be software executed by domain controller 100a, but may be software executed by another ECU.

(17) Each device in the foregoing embodiments is specifically a computer system constituted by a microprocessor, ROM, RAM, a hard disk unit, a display unit, a keyboard, a mouse, and the like. A computer program is recorded in the RAM or hard disk unit. Each device realizes the functions thereof by the microprocessor operating in accordance with the computer program. Here, the computer program is constituted by a combination of a plurality of command codes that indicate commands made to a computer to achieve a predetermined function.

(18) Some or all of the constituent elements constituting the devices in the foregoing embodiments may be implemented by a single integrated circuit through system LSI (Large-Scale Integration). "System LSI" refers to very-large-scale integration in which multiple constituent elements are integrated on a single chip, and specifically, refers to a computer system configured including a microprocessor, ROM, RAM, and the like. A computer program is recorded in the RAM. The system LSI circuit realizes the functions thereof by the microprocessor operating in accordance with the computer program.

The parts of the constituent elements constituting the foregoing devices may be implemented individually as single chips, or may be implemented with a single chip including some or all of the devices.

Although the term "system LSI" is used here, other names, such as IC, LSI, super LSI, ultra LSI, and so on may be used, depending on the level of integration. Further, the manner in which the circuit integration is achieved is not limited to LSIs, and it is also possible to use a dedicated circuit or a general purpose processor. An FPGA (Field Programmable Gate Array) capable of post-production programming or a reconfigurable processor in which the connections and settings of the circuit cells within the LSI can be reconfigured may be used as well.

Further, if other technologies that improve upon or are derived from semiconductor technology enable integration technology to replace LSI circuits, then naturally it is also possible to integrate the function blocks using that technology. Biotechnology applications are one such foreseeable example.

(19) Some or all of the constituent elements constituting the foregoing devices may be constituted by IC cards or stand-alone modules that can be removed from and mounted in the apparatus. The IC card or the module is a computer system constituted by a microprocessor, ROM, RAM, and the like. The IC card or module may include the above very-large-scale integration LSI circuit. The IC card or module realizes the functions thereof by the microprocessor operating in accordance with the computer program. The IC card or module may be tamper-resistant.

(20) The present disclosure may be realized by the methods described above. This may be a computer program that implements these methods on a computer, or a digital signal constituting the computer program. For example, one aspect of the present disclosure may be a computer program that causes a computer to execute each of the characteristic steps included in an integrity verification method illustrated in any one of FIGS. 7 to 9, 11, and 13.

Additionally, the present disclosure may also be computer programs or digital signals recorded in a computer-readable recording medium such as a flexible disk, a hard disk, a CD-ROM, an MO, a DVD, a DVD-ROM, a DVD-RAM, a BD (Blu-ray (registered trademark) Disc), semiconductor memory, or the like, for example. The constituent elements may also be the digital signals recorded in such a recording medium.

Additionally, the present disclosure may be realized by transmitting the computer program or digital signal via a telecommunication line, a wireless or wired communication line, a network such as the Internet, a data broadcast, or the like.

The present disclosure may also be a computer system including a microprocessor and memory, where the memory stores the above-described computer program and the microprocessor operates in accordance with the computer program.

The present disclosure may also be implemented by another independent computer system, by recording the program or the digital signal in the recording medium and transferring the recording medium, or by transferring the program or the digital signal over the network or the like.

(21) The orders in which the steps in the flowcharts described in the foregoing embodiment are performed are for describing the present disclosure in detail, and other orders may be used instead. Some of the above-described steps may be executed simultaneously (in parallel) with other steps, and some of the above-described steps may not be executed.

Additionally, the divisions of the function blocks in the block diagrams described in the foregoing embodiment are merely examples, and a plurality of function blocks may be realized as a single function block, a single function block may be divided into a plurality of function blocks, or some functions may be transferred to other function blocks. Additionally, the functions of a plurality of function blocks having similar functions may be processed by a single instance of hardware or software, in parallel or time-divided.

(22) Although the foregoing embodiment described an example in which the control network system is an in-vehicle network monitoring system, the configuration is not limited thereto, and the system may be a home network system, a network system in a facility (e.g., in a hospital), a factory network system, or the like.

(23) The above-described embodiments and variations may be combined as well.

INDUSTRIAL APPLICABILITY

The present disclosure is useful in integrity verification devices and the like used in control network systems such as in-vehicle network systems.

The invention claimed is:

1. An integrity verification device that verifies an integrity of one or more pieces of software in an in-vehicle network system,
wherein each of the one or more pieces of software is executed by one of one or more electronic control units connected to the in-vehicle network system, and
the integrity verification device comprises:
a processor; and
a memory including a program that, when executed by the processor, causes the processor to function as:
a verification schedule determiner that determines a verification timing at which to verify the integrity of each of the one or more pieces of software;
an integrity verifier that, for each piece of software among the one or more pieces of software, determines, at the verification timing determined for the piece of software, whether first integrity information matches second integrity information, and determines that the integrity of the piece of software is ensured when the first integrity information and the second integrity information match, the first integrity information being information for verifying the integrity of the piece of software and that corresponds to at least a part of the piece of software corresponding to a verification scope, and the second integrity information being information calculated from at least a part of the piece of software at the verification timing; and
a verification priority determiner that determines a verification priority that affects determining of the verification timing or the verification scope,
wherein in response to receiving a notification indicating a change in a vehicle state, the verification priority determiner identifies a specific piece of software, from the one or more pieces of software, being related to the change in the vehicle state and changes the verification priority for the specific piece of software to be higher,
wherein the change in the vehicle state includes at least one of: a travel state of a vehicle changing to an automated driving state, a connection to an external network being established, or a communication anomaly being detected; and
dynamically changing the verification priority for the specific piece of software in accordance with the change in the vehicle state, and immediately verifying integrity accordingly.

2. The integrity verification device according to claim 1, wherein the verification schedule determiner determines the verification timing of one piece of software among the one or more pieces of software such that a verification frequency of the one piece of software increases as the verification priority of the one piece of software increases.

3. The integrity verification device according to claim 1, wherein the integrity verifier determines the verification scope of one piece of software among the one or more pieces of software such that the verification scope broadens as the verification priority of the one piece of software increases.

4. The integrity verification device according to claim 1, wherein the verification priority determiner changes the verification priority of the specific piece of software in accordance with the vehicle state of the vehicle in which the in-vehicle network system is installed.

5. The integrity verification device according to claim 4, wherein the vehicle state further includes at least one of being stopped, traveling, performing automated driving, being in a diagnostic mode, charging, updating, communicating with the external network, or not communicating with the external network.

6. The integrity verification device according to claim 5, wherein in accordance with the vehicle state, the verification priority determiner changes the verification priority for the specific piece of software for which content of processing by the specific piece of software changes in accordance with the vehicle state.

7. The integrity verification device according to claim 1, wherein the one or more pieces of software is any one of an overall piece of software run on the electronic control unit, a hypervisor serving as a virtualization platform run on the electronic control unit, an operating system, a virtual machine, an application, a process, or a file.

8. The integrity verification device according to claim 1, wherein the one or more pieces of software include a plurality of pieces of software each implementing one of a plurality of virtual machines.

9. The integrity verification device according to claim 1, wherein the program, when executed by the processor, further causes the processor to function as:
 an anomaly monitorer that detects an anomalous state indicating at least one of the communication anomaly pertaining to the specific piece of software and an anomaly in a usage amount of a second memory and a second processor included in each of the one or more electronic control units,
 wherein the verification priority determiner raises the verification priority corresponding to the specific piece of software, among the one or more pieces of software, for which the anomalous state is detected.

10. An integrity verification method that verifies an integrity of one or more pieces of software in an in-vehicle network system,
 wherein each of the one or more pieces of software is executed by one of one or more electronic control units connected to the in-vehicle network system, and
 the integrity verification method comprises:
  determining a verification timing at which to verify the integrity of each of the one or more pieces of software;
  for each piece of software among the one or more pieces of software, determining, at the verification timing determined for the piece of software, whether first integrity information matches second integrity information, and determining that the integrity of the piece of software is ensured when the first integrity information and the second integrity information match, the first integrity information being information for verifying the integrity of the piece of software and that corresponds to at least a part of the piece of software corresponding to a verification scope, and the second integrity information being information calculated from at least a part of the piece of software at the verification timing; and
  determining a verification priority that affects determining of the verification timing or the verification scope;
 wherein in response to receiving a notification indicating a change in a vehicle state, the integrity verification method identifies a specific piece of software, from the one or more pieces of software, being related to the change in the vehicle state and changes the verification priority for the specific piece of software to be higher, wherein the change in the vehicle state includes at least one of: a travel state of a vehicle changing to an automated driving state, a connection to an external network being established, or a communication anomaly being detected; and
 dynamically changing the verification priority for the specific piece of software in accordance with the change in the vehicle state, and immediately verifying integrity accordingly.

* * * * *